United States Patent [19]
Chen

[11] Patent Number: 5,477,935
[45] Date of Patent: Dec. 26, 1995

[54] WHEELCHAIR WITH BELT TRANSMISSION

[76] Inventor: Sen-Jung Chen, No. 236, Sec. 3, Ho-Ping W. Rd., Taipei City, Taiwan

[21] Appl. No.: 117,867

[22] Filed: Sep. 7, 1993

[51] Int. Cl.⁶ ................................................... B60K 1/00
[52] U.S. Cl. ........................ 180/65.5; 180/907; 180/65.6
[58] Field of Search .................................. 180/6.5, 65.5, 180/65.6, 907, 65.1; 280/304.1, 250.1

[56] References Cited

U.S. PATENT DOCUMENTS

| | | | |
|---|---|---|---|
| 3,930,551 | 1/1976 | Cragg | 180/907 X |
| 3,955,639 | 5/1976 | Cragg | 180/907 X |
| 4,570,739 | 2/1986 | Kramer | 180/907 X |
| 5,094,310 | 3/1992 | Richey et al. | 180/907 X |
| 5,186,269 | 2/1993 | Avakian et al. | 180/907 X |
| 5,199,520 | 4/1993 | Chen | 180/907 X |
| 5,350,032 | 9/1994 | Smith | 180/907 X |

FOREIGN PATENT DOCUMENTS 2405445 8/1974 Germany ............................. 180/907

*Primary Examiner*—Brian L. Johnson
*Attorney, Agent, or Firm*—Ladas & Parry

[57] ABSTRACT

A wheelchair has a seat portion and a pair of stationary mounting plates fixed to two sides of the seat portion. Each of the mounting plates has a driven pulley rotatably mounted thereon and a driving unit with a driving pulley. An endless belt interconnects the driving and driven pulleys together. A clutch assembly is mounted on the mounting plate and is associated with the driving unit to engage and disengage the driving unit from a pair of wheels that are attached to the stationary mounting plates.

3 Claims, 6 Drawing Sheets

WHEELCHAIR WITH BELT TRANSMISSION

BACKGROUND OF THE INVENTION

1. Field of the Invention

The invention relates to a wheelchair, more particularly to a wheelchair which generates little noise when operated.

2. Description of the Related Art

Referring to FIG. 1, a conventional wheelchair is shown to include a seat portion (B) and a pair of wheels (C) which are attached to two ends of a shaft (D). The shaft (D) is provided rotatably under the seat portion (B) such that the two ends thereof extend respectively from two sides of the latter. The shaft (D) is driven rotatably by a motor (A) which is mounted under the seat portion (B).

Although, the conventional wheelchair is capable of assisting a disabled person, it has a few drawbacks. For example, the wheelchair cannot be folded, and therefore, cannot be transported conveniently.

Referring to FIGS. 2 and 3, another conventional foldable wheelchair is shown to include a seat portion 30, a pair of stationary mounting plates 20 provided respectively on two sides of the seat portion 30, and a pair of wheels 10. Each of the stationary mounting plates 20 has a stationary shaft 251 extending centrally therefrom, a driving unit 21 and a gear unit 22 mounted thereon. The driving unit 21 is driven by a rechargeable battery unit 23 that is also mounted on the stationary plate 20. Each of the wheels 10 includes a rim 11, a central circular plate 24 and a plurality of spokes 13 which extend radially from the circular plate 24 to connect with the rim 11. The circular plate 24 has a central through-hole, a neck flange 15 that extends from the periphery of the through-hole and an annular toothed portion 12. The neck flange 15 of the wheel 10 is sleeved rotatably on the stationary shaft 251 of the stationary plate 20. During assembly, the annular toothed portion 12 of the circular plate 24 of the wheel 10 is meshed with a toothed wheel 223 of the gear unit 22 so that rotation of the driving unit 21 is transmitted to the wheel 10.

Since the conventional wheelchair shown in FIG. 2 is foldable, the conventional wheelchair can be conveniently stored and transported.

A main drawback of the conventional foldable wheelchair is that it generates a relatively loud noise due to engagement of the toothed circular plate 24 and the toothed wheel 223 of the gear means 22, thereby disturbing persons nearby.

A second drawback of the conventional foldable wheelchair is that the wheel cannot be disconnected from the gear unit. Thus, the user has to exert a considerable force in order to move the conventional wheelchair whenever manual operation is desired.

SUMMARY OF THE INVENTION

Therefore, a main objective of the present invention is to provide a wheelchair which generates relatively low noise when in motion.

A second objective of the present invention is to provide a wheelchair, the wheels of which can be disengaged from the driving unit means when desired, thereby facilitating movement of the wheels when the wheelchair is moved manually.

Accordingly, the wheelchair of the present invention includes a seat portion, a pair of stationary mounting plates, each of which is fixed to a respective side of the seat portion, a gear unit and a driving unit mounted on each of the stationary mounting plates. The gear unit includes a driving pulley that is driven by the driving unit. A driven pulley is mounted rotatably on each of the stationary mounting plates. An endless belt is trained between the driving pulley and the driven pulley of on each of the stationary mounting plate so that rotation of the driving unit is transmitted to the driven pulley. A pair of wheels are connected respectively and co-axially to the driven pulleys.

The wheelchair further includes a clutch assembly that can engage and disengage the gear unit from the driving unit. The driving unit includes a driving worm. The gear unit includes a gear disc that has an external toothed periphery meshing with the driving worm, an engaging recess formed in an inner periphery of the gear disc, and a gear shaft. The driving pulley is fixed on one end of the gear shaft. Another end of the gear shaft extends axially into the gear disc and is slidable limitedly therein. The gear shaft has a protrusion extending radially therefrom and a biasing spring which biases the gear shaft so as to push the protrusion to engage the engaging recess of the gear disc.

The clutch assembly has a hand operable lever that is associated with the gear unit. When the hand lever is actuated, the applied force moves the gear shaft against biasing action of the biasing spring. The protrusion of the gear shaft disengages from the gear disc at this stage.

Since the wheel is driven by the transmission belt, the wheelchair of the present invention does not generate too much noise when in motion. If manual operation of the wheelchair is desired, the clutch assembly permits the gear unit to disengage from the wheel, thereby permitting the application of a small amount of force to move the wheelchair.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
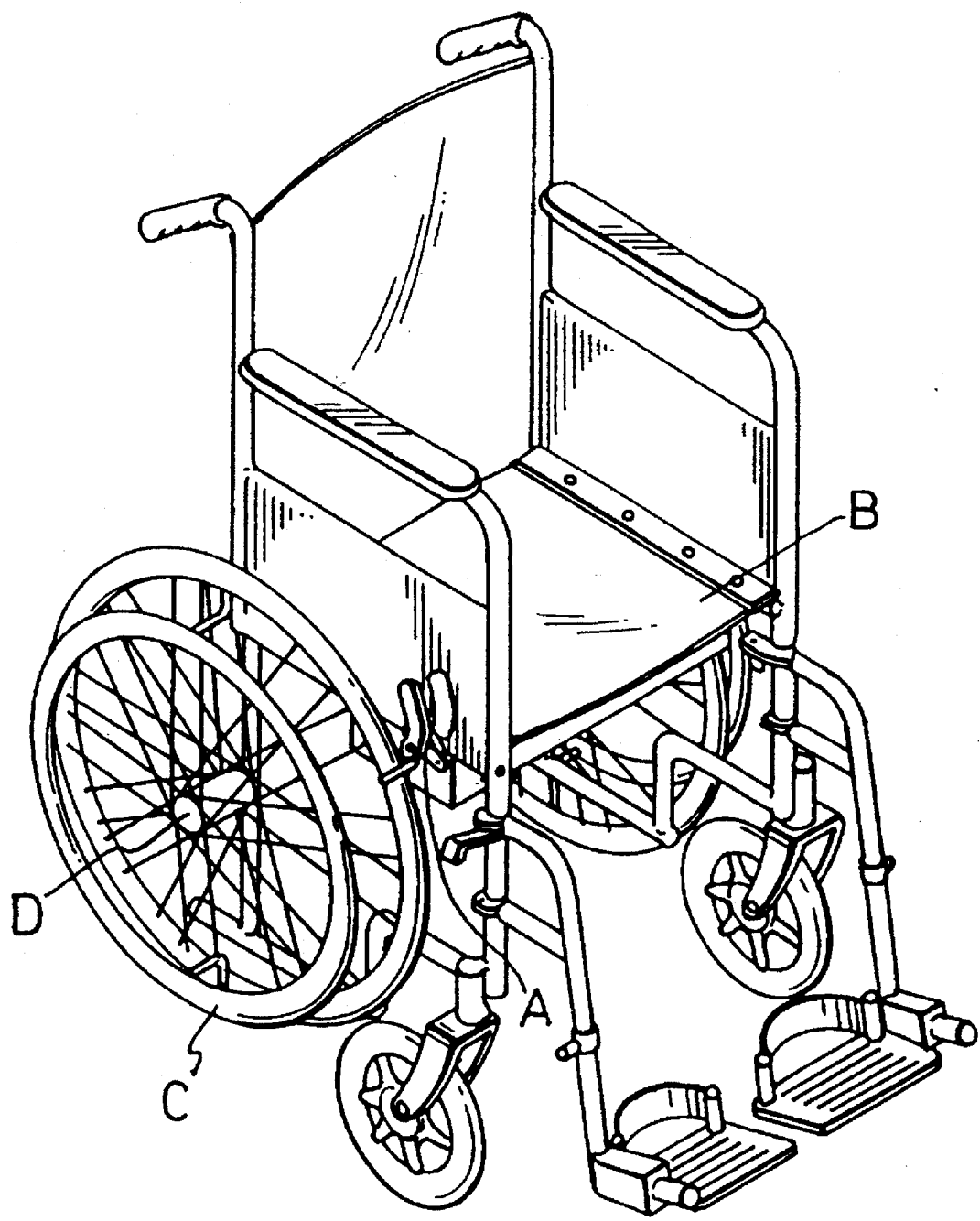
FIG. 1 shows a perspective, schematic view of a conventional wheelchair which is not foldable.
Figure 2:
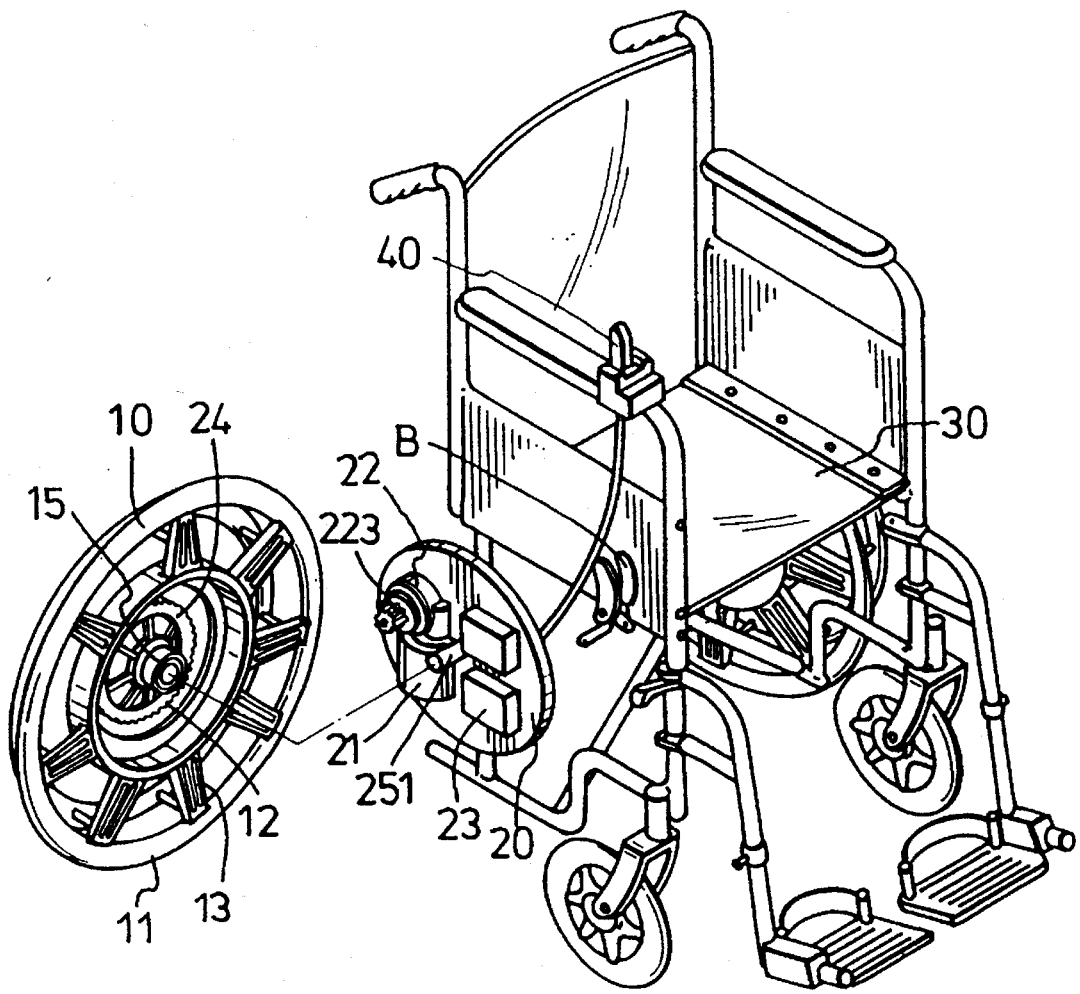
FIG. 2 shows a conventional foldable wheelchair, one of the wheels being removed to illustrate a gear unit thereof.
Figure 3:
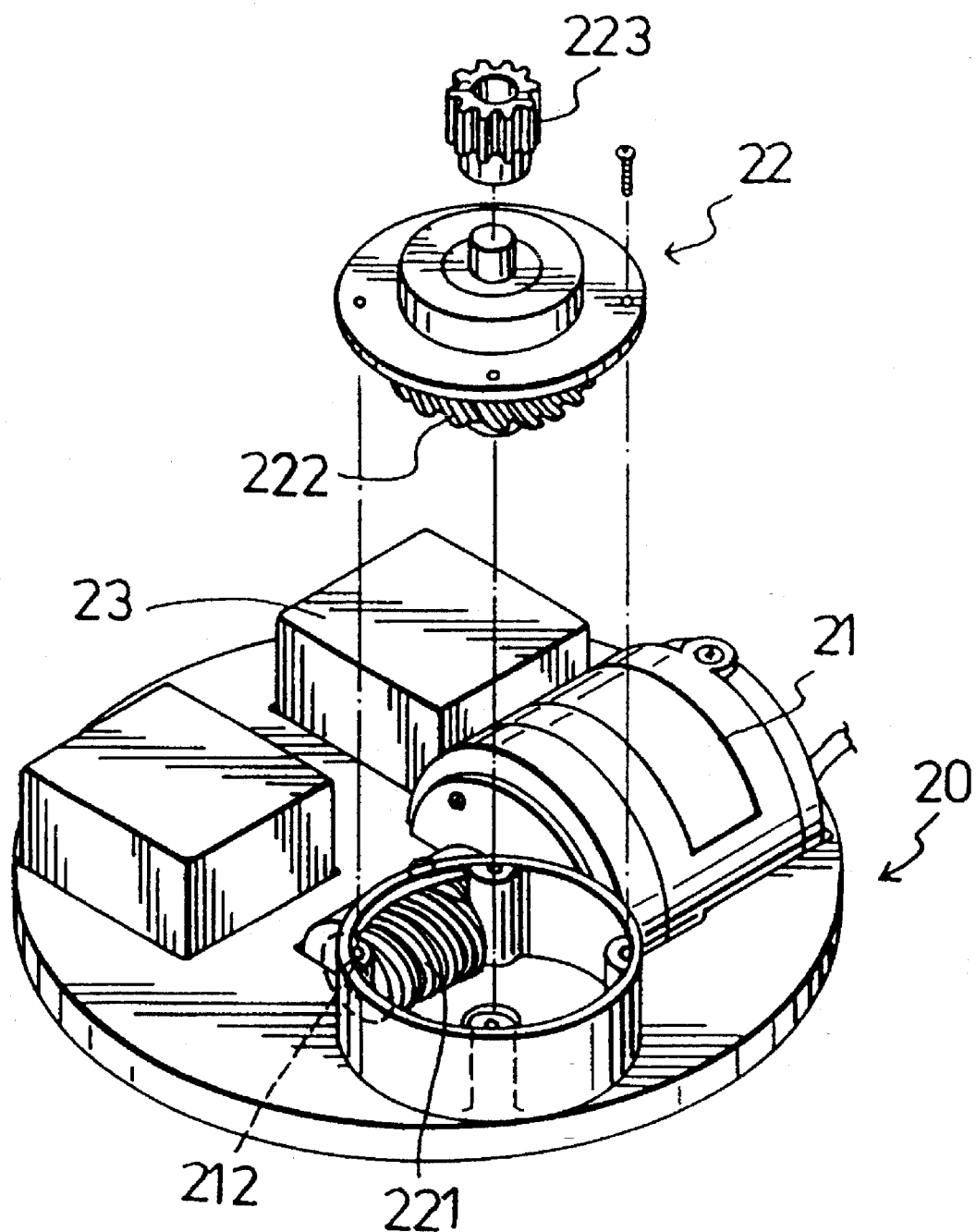
FIG. 3 shows an enlarged view of a stationary mounting plate that is fixed on each side of the conventional foldable wheelchair shown in FIG. 2.

Since the construction of the foldable wheelchair of the present invention is generally similar to the conventional foldable wheelchair shown in FIG. 2, only the characterizing parts and components which relate to the present invention will be disclosed in the following paragraphs.

Figure 4:
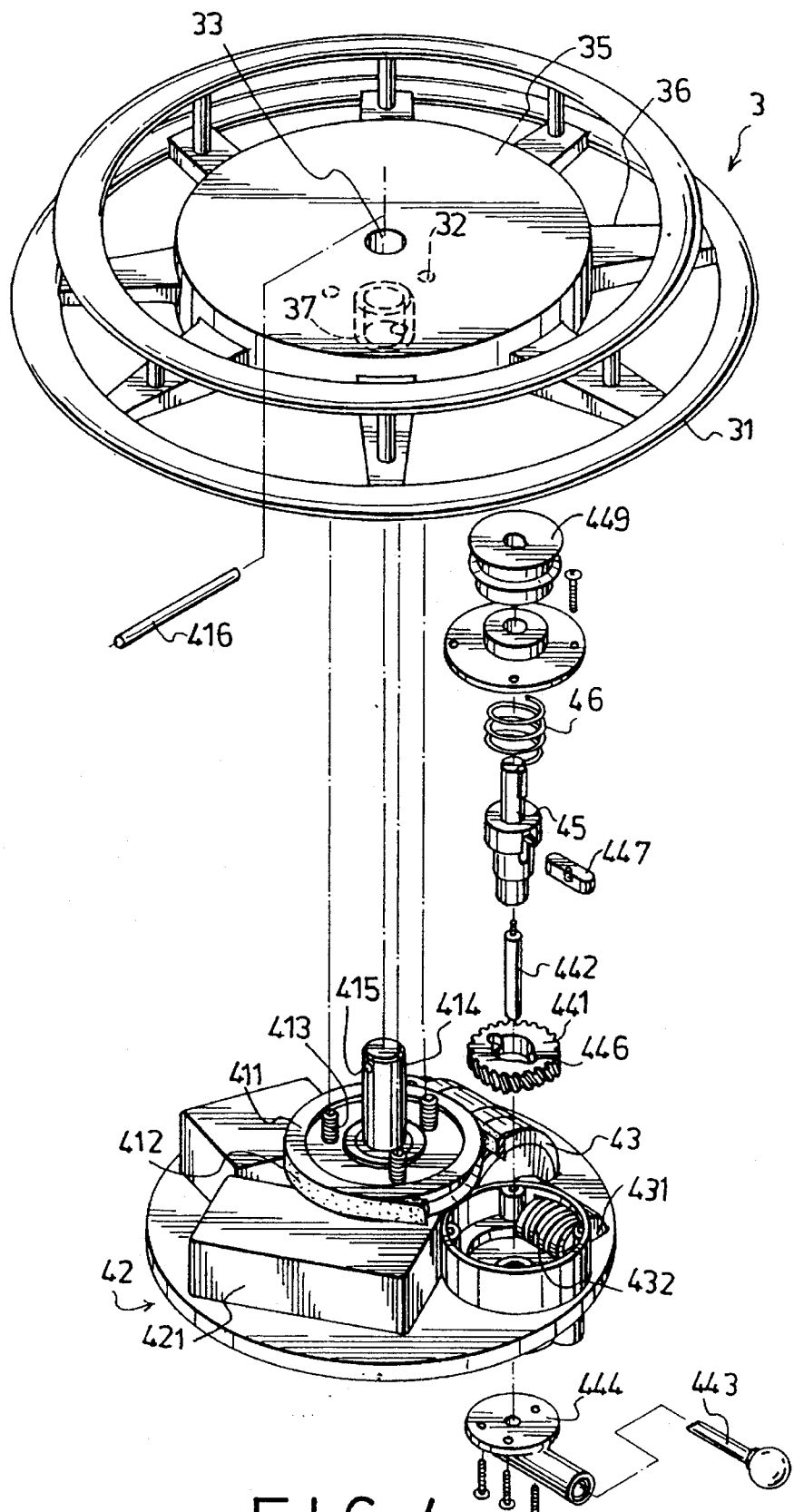
FIG. 4 shows a stationary mounting plate and a wheel of the preferred embodiment of a wheelchair according to the present invention.
Figure 5:
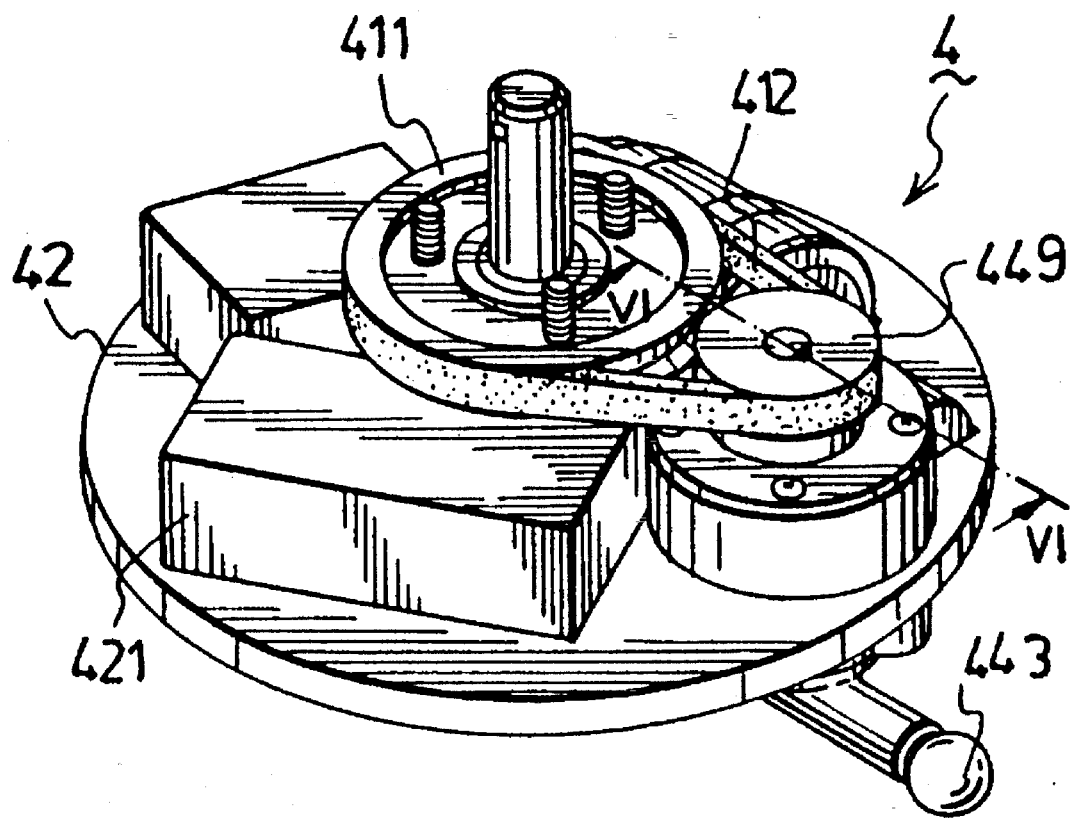
FIG. 5 is an enlarged view of the stationary mounting plate shown in FIG. 4.

Referring to FIGS. 4 and 5, a gear unit 4 includes an enclosed casing 431 fixed on a stationary mounting plate 42, a gear disc 441 disposed inside the enclosed casing 431, and a gear shaft 45 which extends slidably and axially through the gear disc 441 and which is movable limitedly relative to the latter. The gear disc 441 has an external toothed periphery and a pair of diametrical engaging recesses 446 formed in an inner periphery thereof. The gear shaft 45 has two ends extending out of the enclosed casing 431 and a locking protrusion 447 at its intermediate portion. The locking protrusion 447 is located inside the enclosed casing 431 and projects diametrically from the gear shaft 45. A driving pulley 449 is fixed to one end of the gear shaft 45. A biasing spring, such as a compression spring 46, is disposed inside the enclosed casing 431 and biases the gear shaft 45 toward the gear disc 441 so that the two ends of the protrusion 447 engage the pair of engaging recesses 446 in the gear disc 441 in a normal condition. The stationary mounting plates 42 are fixed to two sides of a seat port (not shown) of a chair in a manner similar to that of the conventional wheelchair.

A driving unit, such as a motor 43, has a driving worm 432 that extends into the enclosed casing 431 to mesh with the gear disc 441. A rechargeable battery 421 is mounted on the stationary mounting plate 42 and supplies power to the motor 43.

A driven pulley 411 is mounted rotatably on a stationary shaft 414 which, in turn, is fixed perpendicularly on the stationary mounting plate 42 and has three spaced engaging projections 413. An endless belt 412 interconnects the driving and driven pulleys 449, 411 so that rotation of the motor 43 can be transmitted to the driven pulley 411 when the motor is activated.

Each of a pair of wheels 3 has a rim 31, a central circular plate 35, a plurality of spokes 36 which extend radially from the circular plate 35 to connect with the rim 31. Each of the wheels 3 has a through-hole 33 with a neck-flange 37 that is formed integrally with the circular plate 35 and that projects from the periphery of the through-hole 33, and three spaced recesses 32 that are formed around the through-hole 33. The neck-flange 37 is sleeved on the stationary shaft 414 of the stationary plate 42. The engaging projections 413 of the stationary mounting plates 42 extend into the recesses 32 of the circular plate 35 of the wheel 3, thereby connecting the wheel 3 to the driven pulley 411 so that the wheels rotate with the driven pulley 411 when the latter is driven. Under such a condition, the free end of the stationary shaft 414 protrudes from the through-hole 33 of the wheel 3. A fastening member, such as a locking pin 416, is inserted into a radial hole 415 of the protruded section of the stationary shaft 414. The locking pin 416 extends diametrically through the stationary shaft 414, thereby preventing the wheel 3 from disengaging the driven pulley 411.

Since the gear disc 441 and the driving worm 432 are located within the enclosed casing 431, and since the endless belt 412 is used to transmit rotation to the driven pulley 411, the wheelchair of the present invention generates little noise when in motion.

Figure 6:
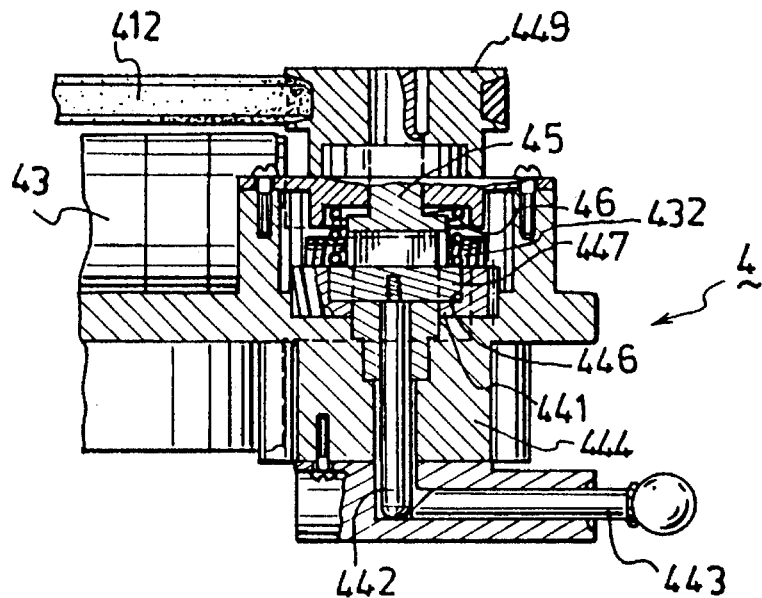
FIG. 6 is a cross sectional view of the stationary mounting plate taken along line VI—VI in FIG. 5, illustrating how a clutch assembly engages the wheel and the driving unit of the wheelchair of present invention.
Figure 7:
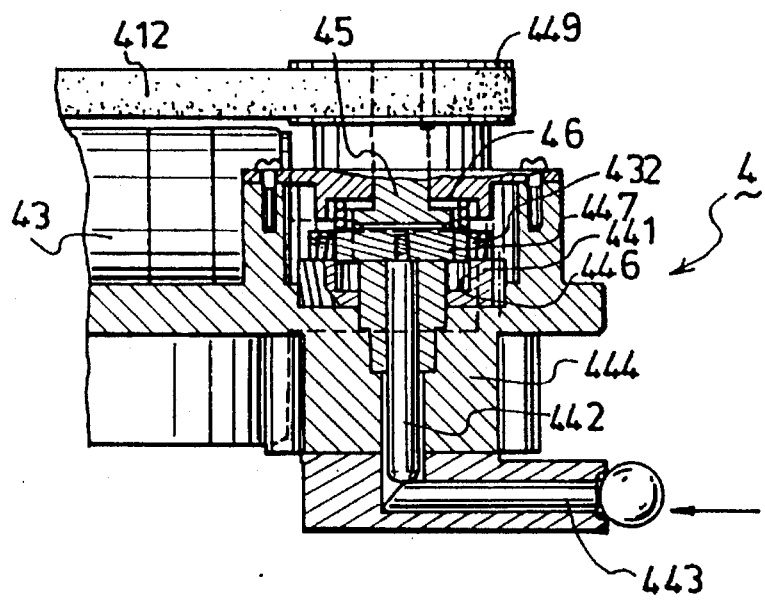
FIG. 7 is a cross sectional view of the stationary mounting plate, illustrating how the clutch assembly disengages the wheel from the driving unit of the wheelchair of the present invention.

Referring to FIGS. 6 and 7, the wheelchair of the present invention further includes a clutch assembly that has a substantially L-shaped casing 444 mounted on the stationary mounting plate 42 opposite to the enclosed casing 431. The L-shaped casing 444 has an operable hand lever 443 which extends out of the same and which is associated operably with one end 442 of the gear shaft 45.

In case of manual operation or battery failure, the hand lever 443 of the clutch assembly is pushed in the direction shown by the arrow in FIG. 7. The gear shaft 45 will move against biasing action of the compression spring 46 so as to permit disengagement of the protrusion 447 from the gear disc 441. The wheel 10, being disengaged from the gear unit 4, will rotate when a small amount of force is applied to the same, thus, facilitating the user of the wheelchair of the present invention.

While a preferred embodiment has been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A wheelchair, comprising:

a seat portion;

a pair of stationary mounting plates, each being fixed to a respective side of said seat portion;

a driving unit mounted on each of said stationary plates;

a gear unit mounted on each of said stationary plates, said gear unit having a gear shaft provided with a driving pulley which is driven by said driving unit;

a driven pulley mounted rotatably on each of said stationary plates;

a pair of endless belts, each interconnecting said driving pulley and said driven pulley on a respective one of said stationary mounting plates such that rotation of said driving pulley is transmitted to said driven pulley;

a pair of wheels, each connected coaxially to a respective one of said driven pulley;

a clutch assembly for connecting and disconnecting said driving unit and said gear unit;

wherein said driving unit includes a driving worm, and said gear unit includes a gear disc having an external toothed periphery meshing with said driving worm and an engaging recess formed in an inner periphery of said gear disc, said gear shaft extending axially into said gear disc movably mounted in an enclosed casing, said gear shaft further having a protrusion projecting radially therefrom and a biasing spring for pushing said gear shaft such that said protrusion normally engages said engaging recess.

2. The wheelchair as is defined in claim 1, wherein each of said driven pulleys has three spaced engaging projections, and each of Said wheels has a circular plate which is formed integrally with said central shaft and which is provided with three recesses to receive said engaging projections.

3. The wheelchair as defined in claim 1, wherein said clutch assembly further includes an operable hand lever which is mounted slidably on said stationary mounting plate and which is connected operably to said gear shaft, said hand lever being operable to move said gear shaft against biasing action of said biasing spring, thereby permitting said protrusion of said gear shaft to disengage from said gear disc.

\* \* \* \* \*